(12) United States Patent
Kong (10) Patent No.: US 7,741,428 B2
(45) Date of Patent: *Jun. 22, 2010

(54) METHOD FOR PRODUCING A BOROHYDRIDE

(75) Inventor: Peter C. Kong, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/196,134

(22) Filed: Aug. 21, 2008

(65) Prior Publication Data

US 2008/0305026 A1 Dec. 11, 2008

Related U.S. Application Data

(62) Division of application No. 10/992,441, filed on Nov. 17, 2004, now Pat. No. 7,420,027.

(51) Int. Cl.
*C08G 79/08* (2006.01)
*C08G 79/00* (2006.01)

(52) U.S. Cl. .................. 528/394; 528/501; 528/503; 528/485; 429/21

(58) Field of Classification Search ............... 528/394, 528/501, 503, 485; 429/21
See application file for complete search history.

(56) References Cited

U.S. PATENT DOCUMENTS 6,670,444 B2   12/2003  Amendola et al.
2006/0078486 A1   4/2006  Chin et al.

OTHER PUBLICATIONS

"Compressed Hydrogen Generation Using Chemical Hydride", Kojima et al., Journal of Power Sources, Jun. 17, 2004, pp. 36-41.
"A Review of Hydrogen Storage Systems Based on Boron and its Compounds", Fakioglu et al., Int'l Journal of Hydrogen Energy, Dec. 29, 2003, pp. 1371-1376.
"Recycling Process of Sodium Metaborate to Sodium Borohydride", Kojima et al., Int'l Journal of Hydrogen Energy, Jul. 23, 2002, pp. 989-993.

*Primary Examiner*—Duc Truong
(74) *Attorney, Agent, or Firm*—TraskBritt

(57) ABSTRACT

A method for producing a borohydride is described that includes the steps of providing a source of borate; providing a material that chemically reduces the source of the borate to produce a borohydride; and reacting the source of the borate and the material by supplying heat at a temperature that substantially effects the production of the borohydride.

8 Claims, 5 Drawing Sheets

FIG. 4

METHOD FOR PRODUCING A BOROHYDRIDE

CROSS-REFERENCE TO RELATED APPLICATION

This application is a divisional of U.S. patent application Ser. No. 10/992,441 filed Nov. 17, 2004, now U.S. Pat. No. 7,420,027, issued Sep. 2, 2008, entitled "METHOD FOR PRODUCING A BOROHYDRIDE," the entire subject matter of which is incorporated herein by reference.

GOVERNMENT RIGHTS

This invention was made with government support under Contract Nos. DE-AC07-991D13727 and DE-AC07-051D14517 awarded by the United States Department of Energy. The government has certain rights in the invention.

TECHNICAL FIELD

The present invention relates to a method for producing a borohydride and, more specifically, to a single step reactive metal combustion process that reduces oxygen from a source of borate, and which simultaneously hydrogenates the borate to synthesize the resulting borohydride.

BACKGROUND OF THE INVENTION

The prior art is replete with numerous teachings that relate to the development of environmentally friendly fuels, that is, fuels that can be used in place of traditional hydrocarbon based energy sources, and that are currently utilized in most overland vehicles. Much research has been directed, as of late, to the use of fuel cells in combination with conventional technology, in so-called "hybrid vehicles." Notwithstanding the advances that have been made in hybrid vehicle design, no single fuel storage system has been developed that can store the fuel that is typically consumed by a fuel cell, that is hydrogen. For transportation applications, a compact lightweight, responsive and affordable hydrogen storage medium is required for overland vehicle applications. In automotive applications, it is estimated that to provide a 300 mile driving range for a typical overland vehicle, would require five to ten kilograms of usable hydrogen, depending upon the size of the vehicle. Beyond the issues of providing a suitable hydrogen storage medium, other engineering issues would also need to be addressed, such as the operating pressure and temperature that the hydrogen may be provided at, the life cycle of the hydrogen storage medium, and any requirements for hydrogen purity, which may be imposed by the fuel cell that is utilized with the overland vehicle.

Other issues, that are currently trying to be addressed for overland vehicle applications, include the methodology for replenishing the hydrogen storage medium; the types of refueling conditions to replenish the storage medium, that is, rate and time, necessary to perform this process; and the hydrogen release rate that might be achieved from such a process. Other important issues directed to safety, toxicity and system efficiency would also need careful consideration. Those familiar with the current state of the art agree that no material currently available today appears to meet all the needs for the storage of large amounts of hydrogen, which might be utilized by a hybrid vehicle. While hydrogen can be stored on an overland vehicle in a substantially pure form, such as compressed gas, or in a cryogenic liquid, these present obvious difficulties with respect to replenishing the hydrogen source once it has been depleted. While some developments have occurred, with respect to storage systems for gaseous and liquid forms of hydrogen, it is fair to say that such systems are unduly complex and still may not meet the requirements as outlined by recent information released by the U.S. Department of Energy.

In view of these difficulties, many skilled in the art have initiated research directed to chemical compounds that can store hydrogen and then later release it for use in an overland vehicle. In this regard, the storage of hydrogen and chemical compounds offers a much wider range of possibilities to meet transportation requirements. However, no single material that has been investigated to date exhibits all the necessary properties.

Finding an effective hydrogen storage medium material therefore, is one of the most difficult challenges facing designers of hybrid or electric overland vehicles. As of late, a number of investigators have considered the feasibility of synthesizing light-metal hydrides, such as borohydrides, for use in overland vehicle applications. However, as of late, the current process for synthesizing borohydrides, for example, is a lengthy solvent process, as more fully understood by a study of U.S. Pat. No. 6,670,444, the teachings of which are incorporated by reference herein. The attractiveness of utilizing a borohydride is understood by a study of the formula set forth below.

$$NaBH_4 + 2H_2O \rightarrow 4H_2 + NaBO_2 + heat\ (300\ KJ).$$

As seen from the formula, noted above, the spent material is sodium metaborate. The regeneration of the borohydride from the spent borates, as noted above, is a lengthy solvent process that is complex and economically unattractive.

Therefore, a method of producing a borohydride that avoids the detriments associated with the prior art practices is the subject matter of the current patent.

SUMMARY OF THE INVENTION

A first aspect of the present invention relates to a method for producing a borohydride that includes the steps of providing a source of borate; providing a material that chemically reduces the source of the borate to produce a borohydride; and reacting the source of borate and the material by supplying heat at a temperature that substantially effects the production of the borohydride.

Another aspect of the present invention relates to a method for producing a borohydride that includes the steps of providing a source of borate; providing a source of hydrogen; providing a source of a reactive metal and/or carbonaceous material; mixing the sources of borate, hydrogen and the reactive metal and/or the carbonaceous material; and reacting the mixture of the sources of borate, hydrogen, and the reactive metal and/or carbonaceous material by heating the mixture to a temperature that is effective to reduce oxygen from the borate and substantially simultaneously hydrogenate the source of borate, which has been previously reduced, to produce a borohydride.

Still further, another aspect of the present invention relates to a method for producing a borohydride that includes the steps of providing a source of a hydrated borate; providing a source of a reactive metal; mixing the source of hydrated borate with the source of the reactive metal to form a mixture; providing a chemical reactor and supplying the mixture to the chemical reactor; sealing the chemical reactor following the step of supplying the mixture to the chemical reactor; evacuating the chemical reactor to create a negative pressure within the chemical reactor; and heating the mixture in the chemical reactor to a temperature that facilitates a conversion of the hydrated borate to a borohydride and the production of hydrogen gas.

Moreover, still another aspect of the present invention relates to a method for producing a borohydride that includes providing a source of anhydrous borate; providing a source of a reactive metal; mixing the source of the anhydrous borate with the source of the reactive metal to form a mixture; providing a chemical reactor; continuously supplying the mixture to the chemical reactor; supplying a source of hydrogen gas to the chemical reactor while the mixture is received therein; and heating the mixture and the hydrogen gas, which are in the chemical reactor, to a temperature that facilitates a conversion of the anhydrous borate to a borohydride.

These and other aspects of the present invention will be described in greater detail hereinafter.

BRIEF DESCRIPTION OF THE DRAWINGS

Preferred embodiments of the invention are described below with reference to the following accompanying drawings.

FIG. 3 is a graph depicting a Gibbs Free Energy of Formation ($\Delta G_f$) for different oxides, which are produced by means of a methodology of the present invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The methodology for the present invention is best understood by a study of FIGS. 1-5, respectively. As understood by these drawings, the methodology of the present invention relates to a method for producing a borohydride that includes a first step of providing a source of borate; providing a material that chemically reduces the source of the borate to produce a borohydride; and reacting the source of borate and the material by supplying heat at a temperature that substantially effects the production of the borohydride. The present methodology uses a solid state reactive metal combustion process to reduce oxygen from the borate, followed substantially simultaneously by hydrogenation to synthesize the resulting borohydride. This chemical reaction occurs in a single step, and the source of hydrogen for the hydrogenation comes from a source of hydrogen gas; another hydrocarbon, or simply water.

Figure 5:
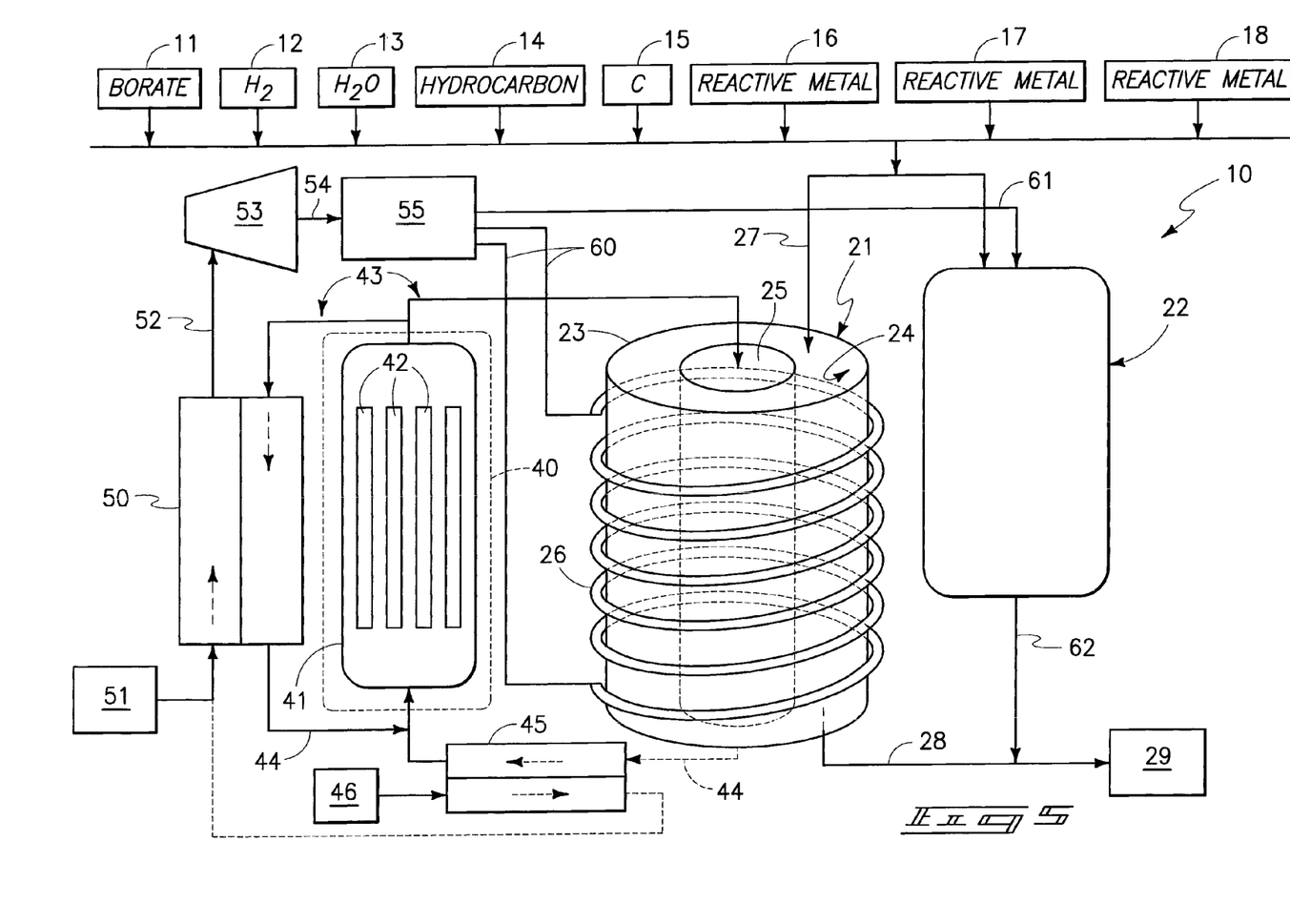
FIG. 5 is a greatly simplified schematic view of one arrangement that may be utilized to practice a method of the present invention.
Figure 7:
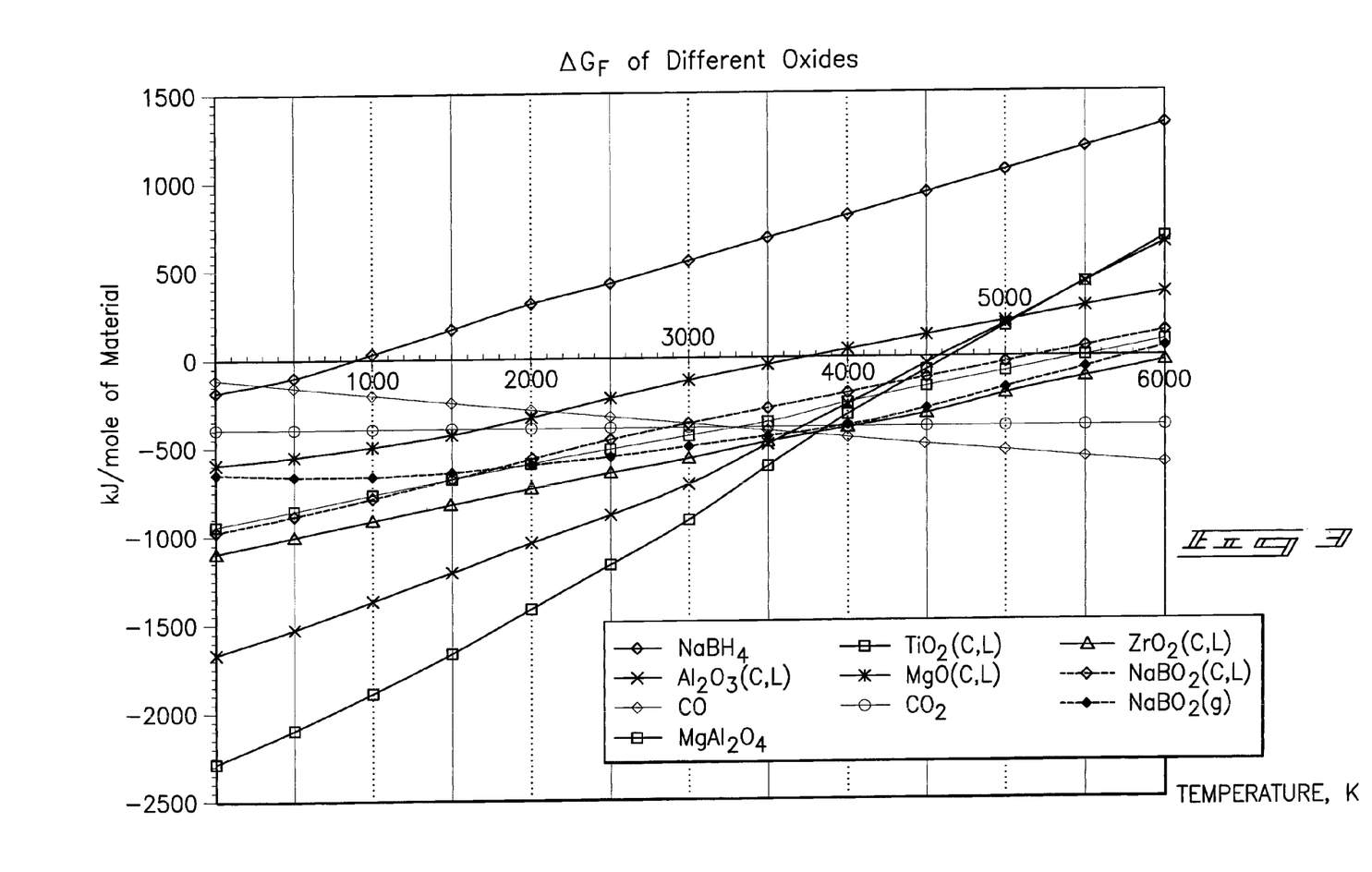

Referring now to FIG. 5, this drawing depicts a greatly simplified schematic view of an arrangement to practice the methodology of the present invention. The arrangement for generally practicing the methodology of the present invention is generally indicated by the numeral 10. The present methodology reacts as a source of borate 11, such as sodium metaborate, with other materials that include a source of hydrogen gas 12; a source of water 13; a source of a hydrocarbon 14; a source of carbon 15; and first, second and third sources of reactive metals 16, 17 and 18, respectively. In the discussion that follows, the chemical formulations, as described below, have all been made by reference to a starting material that includes sodium metaborate, as might be supplied at 11. This material has been selected primarily because it is widely available. However, it will be recognized that other similar hydrides could be utilized in the present process with equal success. With respect to the various materials as referenced above, it should be understood that the source of hydrogen, such as a hydrocarbon, 14 may include a substance such as methane, but other similar materials (both gaseous and liquid) will work with equal success. Still further, various carbonaceous materials may be provided for the source of carbon 15, all of which can be provided in a form whereby it may be combusted or reacted as will be described hereinafter. The first, second, and third sources of reactive metals 16, 17 and 18, respectively, are chosen from the group of reactive metals that include aluminum, magnesium, titanium, chromium, silicon, tantalum, vanadium, and zirconium, and their various alloys.

Examples of reactions that may be conducted in accordance with the present methodology are set forth below and are divided into groups 1, 2 and 3, respectively. The Group 1 reactions are noted immediately below.

Group 1

(Reaction 4)

(Reaction 3)

It will be understood that the reactions of Group 1 include among others, reacting a source of borate 11, along with a source of water 13, or other source of hydrogen 12, and a reactive metal, as indicated, to produce a borohydride and a substantially stable oxide as a byproduct.

In the Group 2 reactions, as noted below, the reactions include a source of borate 11, which further is combined with a source of hydrogen gas 12 and corresponding reactive metal 16, 17 and/or 18, respectively, to provide a resulting source of borohydride and a substantially stable oxide.

Group 2

(Reaction 1)

$2NaBO_2+Mg+2Al+4H_2 \rightarrow 2NaBH_4MgAl_2O_4$ $NaBO_2+Ti+2H_2 \rightarrow NaBH_4TiO_2$ $NaBO_2+Zr+2H_2 \rightarrow NaBH_4ZrO_2$ $3NaBO_2+4Cr+6H_2 \rightarrow 3NaBH_4+2Cr_2O_3$ $5NaBO_2+4V+10H_2 \rightarrow 5NaBH_4+2V_2O_5$ $5NaBO_2+4Ta+10H_2 \rightarrow 5NaBH_4+2Ta_2O_5$ $NaBO_2+Si+2H_2 \rightarrow NaBH_4SiO_2$ $2NaBO_2+2Al+CH_4+2H_2 \rightarrow 2NaBH_4+2Al_2O_3+CO$ (Reaction 2)

In the Group 3 reactions, identified below, these reactions include a source of borate 11, which is combined with a source of hydrogen 14 that may include hydrogen gas 12 or water 13, plus one or more reactive metals 16, 17 or 18, or other material, to produce a resulting borohydride and a substantially stable oxide, as shown. For purposes of this application, silicon is a reactive metal.

Group 3

Figure 1:
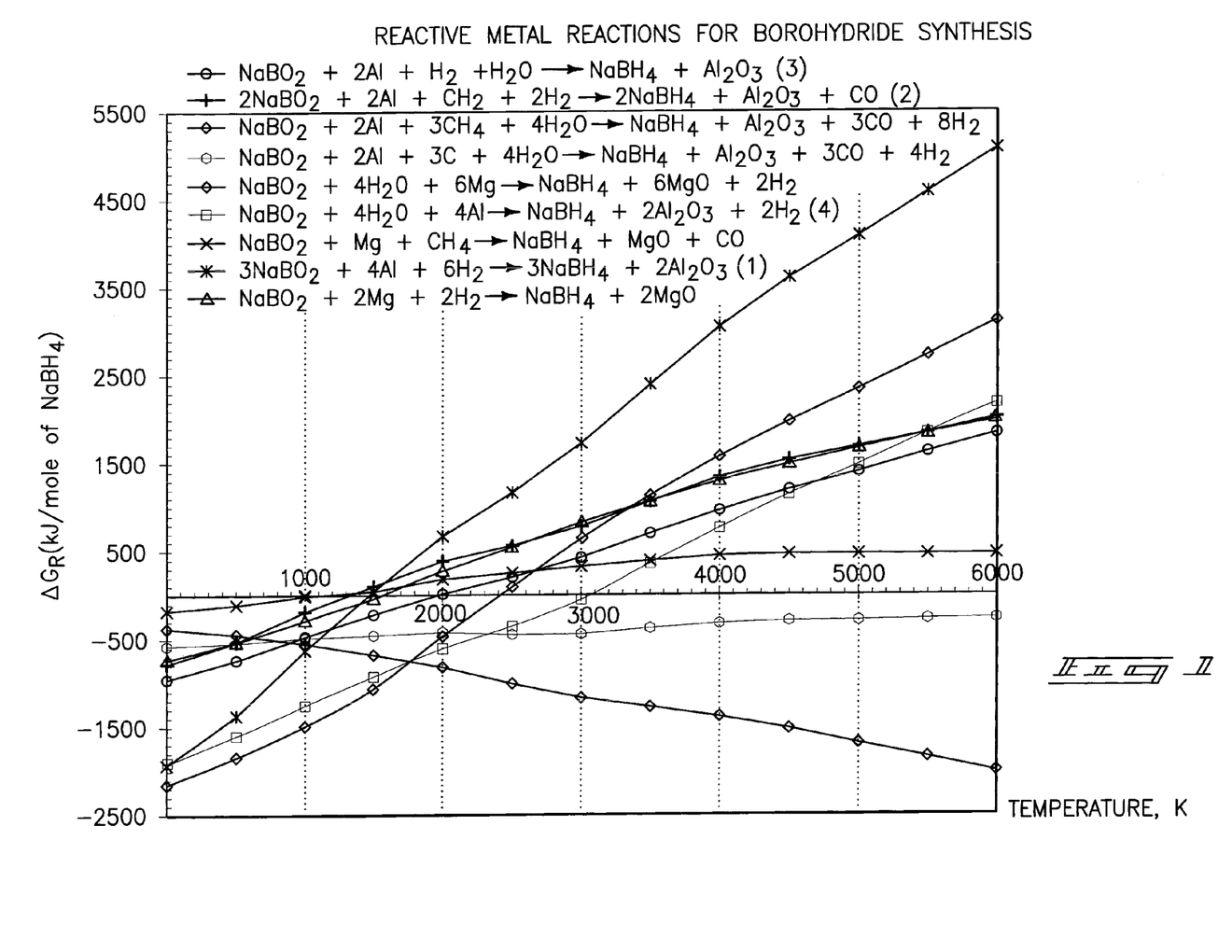
FIG. 1 is a graph of thermodynamic predictions for reactions of aluminum and magnesium to synthesize a borohydride according to a method of the present invention.

$NaBO_2+2H_2O+Mg+2Al \rightarrow NaBH_4MgAl_2O_4$ $2NaBO_2+Mg+2Al+4H_2 \rightarrow 2NaBH_4MgAl_2O_4$ $NaBO_2+H_2O+H_2+Mg+Si \rightarrow NaBH_4MgSiO_3$ $NaBO_2+2H_2O+2Mg+Si \rightarrow NaBH_4+Mg_2SiO_4$ $NaBO_2+H_2O+H_2+Mg+Ti \rightarrow NaBH_4MgTiO_3$ $NaBO_2+3H_2O+Mg+2Ti \rightarrow NaBH_4MgTi_2O_5+H_2$ $2NaBO_2+H_2O+H_2+2Al+Si \rightarrow 2NaBH_4+Al_2SiO_5$ $2NaBO_2+H_2O+3H_2+Mg+2Ti \rightarrow NaBH_4MgTi_2O_5$ Referring now to FIG. 1, the thermodynamic predictions for selective Group 1, 2 or 3 Reactions, noted above, to synthesize a resulting sodium borohydride from a source of borate 11, which includes sodium metaborate, are shown. Each of the reactions, as seen in FIG. 1, shows a different condition for the Gibbs Free Energy of Reaction ($\Delta G_R$). In this regard, and for the Reactions 1 and 2 of Group 2, it will be seen that each has a negative Gibbs Free Energy of Reaction that occurs below 1500 K. Yet further, for Reaction 3 (Group 1), this chemical reaction has a negative Gibbs Free Energy of Reaction below 2000 K. Further, Reaction 4 (Group 1) has a negative Gibbs Free Energy of Reaction below 3000 K. This information suggests that thermodynamic conditions are favorable for a borohydride to form below these temperatures. By reviewing the information show in FIG. 1, it will be noted that several of the reactions have negative Gibbs free energies at all temperatures.

All the reactions graphically depicted in FIG. 1, show a negative Gibbs Free Energy of Reaction at 1000 K. Still further, several of the reactions also are thermodynamically favorable at high temperatures, that is, greater than 2000 K. These specific reactions are candidates for thermal plasma processing. Therefore, based upon this information, the inventor has concluded that chemical reactions can be conducted at temperatures both above and below 1000 K in order to generate borohydride from a suitable source of borate 11.

The present methodology for synthesizing a borohydride from a source of borate, such as sodium borate, is not limited to the use of reactive metals such as aluminum and magnesium only. Metals such as titanium, chromium, silicon, tantalum, vanadium and zirconium or mixtures thereof, which may be provided from the source of reactive metal(s) 16, 17 and 18, may also be provided, and which are reacted with the source of borate 11 in order to produce the resulting borohydride.

Figure 2:
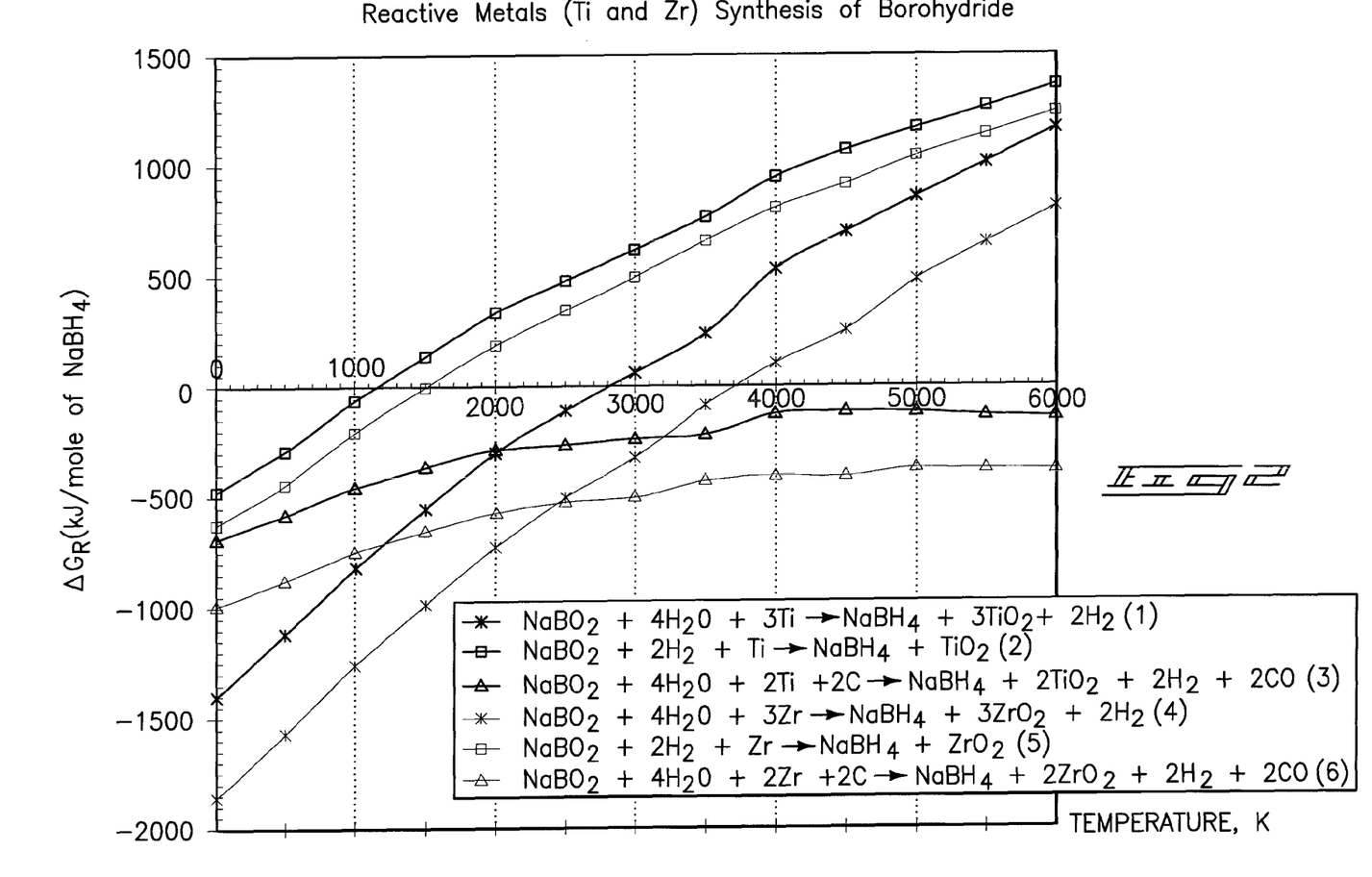
FIG. 2 is a graph depicting Gibbs a Free Energy of Reaction for the materials titanium, and zirconium, which are used to reduce a source of borate to produce a borohydride. Reactions, which are graphically depicted, are shown on that drawing.

FIG. 2 depicts the Gibbs Free Energy of Reaction ($\Delta G_R$) plots for titanium, and zirconium, and the corresponding reduction of the source of borate 11 to form a borohydride. It will be noted from a review of this drawing that the titanium and zirconium reactions are closely similar to each other. It is evident, from reviewing the data in this graph that all the identified reactions are thermodynamically favorable at temperatures of less than about 1150 K. Further, above 1150 K, Reaction 2, as identified in FIG. 2, becomes thermodynamically unfavorable, as compared to Reaction 5. Still further, Reactions 1 and 4, as identified in FIG. 2, are favorable both at relatively high and low temperatures. As shown, the Gibbs Free Energy of Reaction for Reaction 1 turns substantially positive at about 2825 K and substantially positive at 3700 K for Reaction 4. Yet further, Reactions 3 and 6 are thermodynamically favorable at all temperatures. It will be noted that these two reactions, as set forth in FIG. 2, also utilize the source of carbon 15 for reduction, and the production of carbon monoxide as a byproduct, and appear to stabilize the respective Reactions at substantially all temperatures. Reactions 1, 3, 4 and 6, as seen in FIG. 2, appear to be candidates for thermal plasma processing as will be discussed in greater detail, hereinafter, to produce a resulting borohydride.

Referring now to FIG. 3, a graphical depiction is provided of the Gibbs Free Energy of Formation ($\Delta G_F$) of Different Oxides, as contemplated by the methodology of the present invention. As seen in FIG. 3, the Gibbs Free Energy of Formation for crystal, liquid (C, L) and gas phases (G) of sodium metaborate are shown. As a general matter, it will be seen that below 3500 K, aluminum, titanium, and zirconium are more effective than magnesium for reactive metal reduction of the source of borate 11 to synthesize a resulting borohydride. However, at temperatures slightly greater than 3000 K, carbon reduction of the borates is more favorable to synthesize the resulting borohydride. The data, as provided in the drawings, suggest that it is feasible to use thermal plasmas to synthesize borohydrides using either reactive metals 16, 17, or 18 or carbonaceous materials 14 or 15, or a combination of both, to reduce borates at temperatures of greater than about 1500 K.

Figure 4:
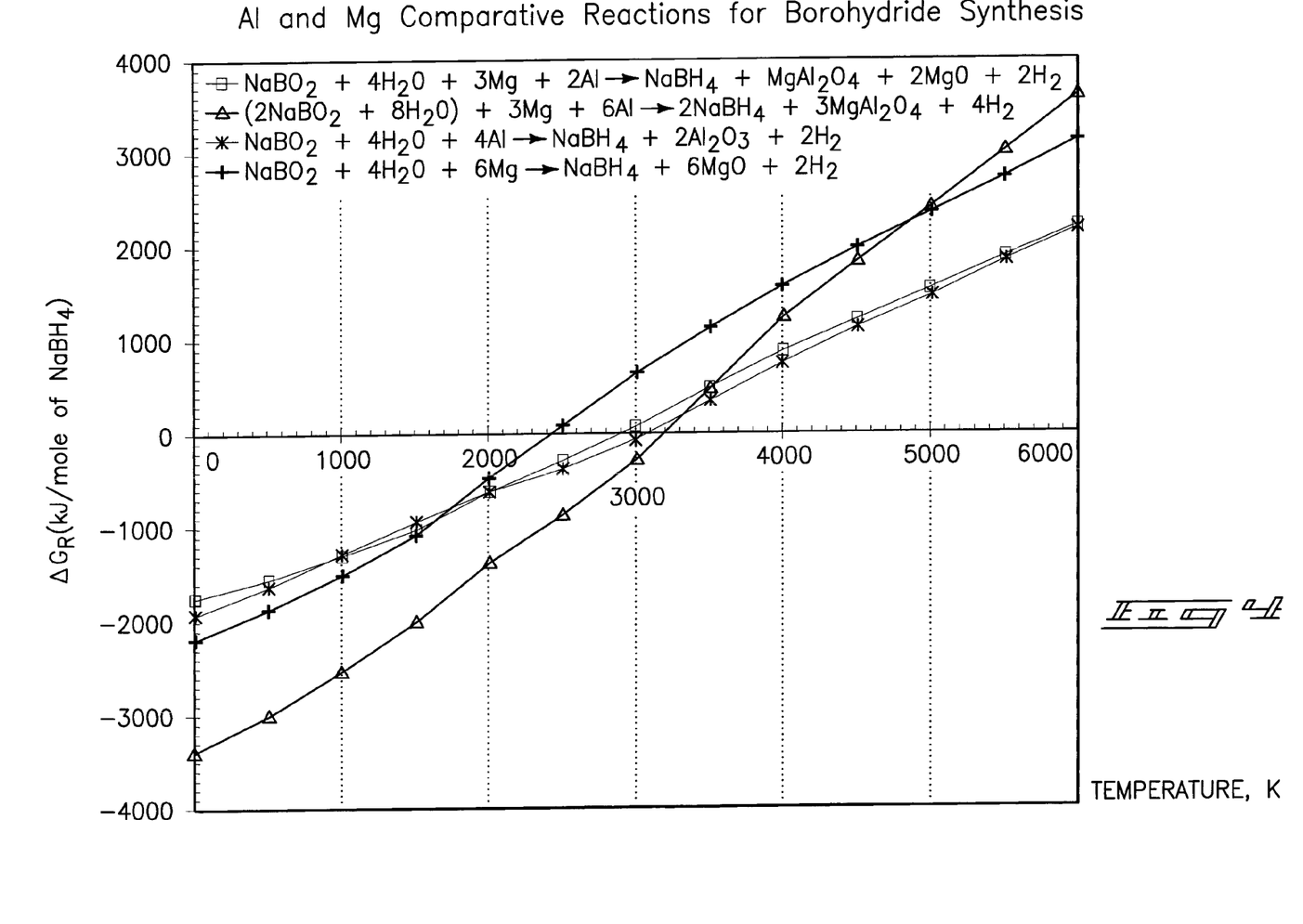
FIG. 4 is a graph depicting a comparative Gibbs Free Energy of Reactions ($\Delta G_R$), as identified in FIG. 4.

Referring now to FIG. 4, it will be seen that in addition to the reaction of a single reactive metal to synthesize a resulting borohydride, a mixture of reactive metals offers additional pathways to synthesize borohydrides from the source of borate 11. As illustrated in FIG. 4, aluminum, magnesium, and borate form stable oxides of magnesium aluminate, which is a natural mineral. In this regard, magnesium aluminate is a very stable oxide and considered much more so than alumina. It is speculated that the formation of a stable oxide permits aluminum and magnesium to extract the oxygen from the source of borate 11. FIG. 4 also shows the comparative Gibbs Free Energy of Reaction ($\Delta G_R$) plots for these and other reactions. As seen in the reactions as identified in FIG. 4, water is the source of hydrogen to form the resulting borohydride. However, the source of hydrogen gas 12 can be used directly in these reactions to synthesize a resulting borohydride. The extreme temperature end for these several reactions is between about 2500 to about 3000 K. As a result, these reactions are suitable for a thermal plasma process to produce a resulting borohydride. On the other hand, the lower temperature end of these reactions, that is, less than about 1200 K, is suitable for other low temperature reaction processes as will be described hereinafter.

Referring now to FIG. 5, the respective sources of borate 11, hydrogen 12, water 13, hydrocarbon 14, carbon 15, and first, second and third reactive metals 16, 17 and 18 are individually and selectively mixed together in various combinations to provide a mixture that is transmitted along a course of travel and supplied to a pair of chemical reactors, which are generally indicated by the numerals 21 and 22, respectively. These respective chemical reactors, which are generally graphically depicted, may be continuous flow chemical reactors, or further, batch reactors that can be substantially sealed during the subsequent chemical reaction process. As seen in FIG. 5, the first reactor 21 is defined by a housing 23. Still further, the housing 23 defines a cavity 24. As seen in FIG. 5, a heat radiator 25, which may be manufactured from a ceramic or similar material, is positioned in the cavity 24 and is operable to radiate heat energy from a heated fluid (gas or liquid) that is received therein. Still further, and as shown in FIG. 5, an electrically energized supplemental heating coil 26 is positioned thereabout and is disposed in heat transferring relation relative to the cavity 24 in order to provide supplemental heat to facilitate the reaction of the mixture of materials that are being selectively supplied from the various sources of material 11-18, respectively. As seen by reference to FIG. 5, the various sources of material 11-18 are individually and selectively mixed to provide a resulting reactive mixture, which is then supplied by way of a conduit 27, or other suitable conveying means to the cavity 24. The reactive mixture thereafter chemically reacts to provide a resulting borohydride. Any byproducts are thereafter removed by way of a conduit, or other conveying means that is generally indicated by the numeral 28. These products are received into a storage container 29.

Referring still to FIG. 5, it will be seen that in the methodology of the present invention, an electrical generation facility is provided and that is generally indicated by the numeral 40, as shown in dashed lines. The electrical generation facility 40 could include a facility that is powered by fossil fuels of various types; or as seen in FIG. 5, the facility could utilize a nuclear reactor, which is generally indicated by the numeral 41. It should be understood that both nuclear powered, as well as fossil fuel generated electrical generation facilities, could be used in combination. It is understood that during the process of generating electricity, either fossil fuel is burned to generate heat, or in a nuclear reactor 41, a plurality of fuel rods 42 are utilized to generate heat energy. This heat energy is subsequently used to produce high pressure steam, which is then employed with a steam turbine to generate electricity. As seen in FIG. 5, however, and with respect to the use of the nuclear reactor 41, it should be understood that the nuclear reactor 41 is gas cooled (typically by helium), and the heat energy produced by the nuclear reaction is removed from the nuclear reactor 41 by the heated helium gas and by a pathway 43. This heated cooling gas is bifurcated into two portions or pathways 43, as indicated. A first portion of this heated cooling gas travels to, and is received in, the heat radiator 25. Further, another or second portion of the heated cooling gas is diverted to a heat exchanger, which will be discussed below. The heated cooling gas, once received in the heat radiator 25, releases its heat to same. This same heat is then released by the heat radiator 25 to heat the reactive mixture that has been previously received in the first reactor 21 to a temperature of less then about 1000° C. This temperature facilitates the chemical reactions earlier discussed. The cooling fluid received from the nuclear reactor 41 then exits the heat radiator 25 by means of a pathway 44 (as shown by dashed lines) and passes through a first heat exchanger 45 whereby any remaining residual heat energy is transferred by way of the heat exchanger 45 to a first source of water 46, which is utilized to produce steam.

As seen in FIG. 5, a second heat exchanger 50 is provided, which is further coupled in fluid flowing relation relative to the electrical generation facility 40 and, more specifically, to the nuclear reactor 41. As illustrated, the second heat exchanger 50 receives a second portion of the heated cooling gas from the nuclear reactor 41, and is operable to transmit the heat energy received from the second portion of the heated cooling gas to a second source of water 51, which is mixed with the first source of water 46 and then supplied to the second heat exchanger 50. Therefore, it will be seen that the first source of water 46 and the second source of water 51 are heated by the high temperature cooling gas provided from the nuclear reactor 41 to provide a source of steam 52. This source of steam 52 is then coupled in fluid flowing relation relative to a conventional steam turbine 53. Under the influence of the high pressure steam, the steam turbine 53 is operable through mechanical energy 54 to operate a generator 55 that generates a source of electricity. As seen, the electrical power output from the generator 55 is supplied by means of a pair of electric conduits 60 to selectively energize the heating coil 26, which is disposed in heat transferring relation relative to the first reactor 21. Still further, the electrical power output from the generator 55 is also supplied to the second reactor 22 as represented by the arrow labeled 61. The electrical power output of the generator 55 is operable to create a thermal plasma through conventional means, which acts upon the previously described reactive mixture that is prepared from the plurality of the source materials 11-18, respectively, in order to generate a resulting borohydride. As earlier indicated, the first and second reactors 21 and 22 may comprise continuous flow, as well as batch reactors. Upon being exposed to the high temperature plasma, as generated by the electrical power output of the generator 55, the high temperature plasma reactions proceed to produce a resulting borohydride, which is then removed by means of a conduit or other conveyance 62 from the second reactor 22 and is received in the storage container 29. As earlier noted, the thermal plasma induced carbon reduction reactions are typically high temperature reactions, that is, they occur at greater than about 1500° C. Therefore, it will be seen that the electricity generated from the gas cooled nuclear reactor 41 provides electrical power to facilitate two borohydride production processes substantially simultaneously, that is, a low temperature process that occurs at less than about 1000° C. and a second high temperature process that is implemented by means of a high temperature plasma, which has a temperature of greater than about 1000° C.

Referring now to FIGS. 1-5, the methodology of the present invention broadly includes, as a first step, providing a source of borate 11; providing the source of materials 12-18, which reduces the source of the borate 11 to produce a borohydride; and reacting the source of borate 11 and the materials 12-18 by supplying heat at a temperature that substantially effects the production of the borohydride. In the methodology as shown, the production of the resulting borohydride occurs in a single step. Still further, the method as described above, includes a step of providing a source of hydrogen 12, and wherein the source of hydrogen 12 hydrogenates the source of the borate 11 to produce the borohydride. This source of hydrogen 12 may be selected from the group that comprises hydrogen 12, water 13, and/or a hydrocarbon, which is generally indicated by the numeral 14. In addition to the foregoing, the material selected to reduce the source of borate 11 may comprise a reactive metal 16, 17 or 18 or a carbonaceous material 14 or 15.

As contemplated by the present invention, the step of providing a material that chemically reduces the source of borate 11 to produce a borohydride includes a step of providing a reactive metal 16, 17 or 18 and further conducting a solid state combustion reaction of the reactive metal. Still further, the present invention also contemplates a step of providing a reactive metal 16, 17 or 18 and further conducting a solid state chemical reaction substantially without the combustion of the reactive metal(s) 16, 17 or 18. As noted earlier, the present methodology can also be accomplished by reacting a mixture of reactive metals 16, 17 and/or 18. The methodology may also include a step of a solid state combustion of some of the reactive metals 16, 17 and/or 18 and a solid state reaction substantially without combustion of the remaining reactive metals. In the methodology as shown, the group of reactive metals, as earlier discussed, chemically reduces the source of borate 11, when reacted with the source of borate 11 at a temperature of greater than about 330° C. In the arrangement as shown, the reactive metal and/or mixture of reactive metals that are selected reacts with the source of borate 11 at a temperature that produces the borohydride and a substantially stable oxide as a byproduct. As seen in FIG. 5 and as discussed previously, the temperature at which the borohydride is produced in the first reactor 21 is less than about 1000° C. Still further, the temperature at which the borohydride is produced in the second reactor 22 is greater than about 1000° C.

As illustrated in FIG. 5, the method of producing borohydride of the present invention includes a step of reacting the source of borate 11 and the source of material(s) 12-18 by supplying heat at a temperature. In this regard, the step of supplying heat at a temperature includes the steps of generating heat at a temperature from the operation of an electrical generation facility 40, and generating electricity 61 from the operation of the electrical generation facility 40. As earlier noted, the electrical generation facility 40 may be powered by a combustible fossil fuel, or other fuel, or further powered by a nuclear reaction that occurs in a gas cooled nuclear reactor 41. As earlier discussed, before the step of generating heat at a temperature from an electrical generation facility 40, the method further includes the steps of providing a first reactor 21; supplying the source of borate 11 and the selected source of material(s) 12-18 to the first reactor 21; providing a cooling fluid via pathway 43 for removing heat energy that is generated by the operation of the electrical generation facility 40, and wherein the cooling fluid is heated to a temperature; and supplying the previously heated cooling fluid to the first reactor 21 to effect the reaction of the source of borate 11 and the individual source of material(s) 12-18. In addition, the methodology of the present invention further includes the steps of providing a second reactor 22, and supplying the source of borate 11 and selected source of material(s) 12-18, respectively, to the second reactor 22; and supplying the source of electricity 61, which is generated by the electrical generation facility 40 to the second reactor 22 to generate a thermal plasma that heats the source of borate 11 and the selected source of material(s) 12-18 to a temperature that effects the production of the borohydride. Still further, and as discussed earlier, the method of the present invention further includes the step of supplying the electricity 61, which is generated by the operation of the electrical generation facility 40 to heat the first reactor 21 to effect the reaction of the source of borate 11 and the source of material(s) 12-18 to produce the borohydride.

In the methodology of the present invention, the method also includes the steps of providing a source of borate 11; providing a source of hydrogen 12; providing a source of a reactive metal and/or carbonaceous material 14-18, respectively; mixing the sources of borate, hydrogen and the reactive metal and/or carbonaceous material; and reacting the mixture of the sources of borate, hydrogen, and the reactive metal and/or carbonaceous material by heating the mixture to a temperature, which is effective to reduce oxygen from the source of borate 11 and substantially simultaneously hydrogenate the source of borate 11, which has been previously reduced, to produce a borohydride, which is then received in a storage container 29. As discussed above, the step of reacting the mixture of the borate, hydrogen and the reactive metal and/or carbonaceous material by heating the mixture to the temperature results in the combustion of the reactive metal and/or carbonaceous material. In the practice of the present methodology, the method may further include a step of providing a mixture of reactive metals 16, 17 and 18 and/or carbonaceous material 15. In the step of reacting the mixture of the borate, hydrogen, and reactive metal and/or carbonaceous material by heating, it should be understood that the methodology can be practiced by the use of a high temperature plasma, or without the use of a high temperature plasma, or the heating achieved, at least in part, by the use of a high temperature plasma. In this regard, the method further includes steps of providing a first reactor 21, and a second reactor 22, and supplying, at least in part, the mixture that includes the source of borate 11, hydrogen 12, the reactive metals 16, 17 and 18 and/or carbonaceous materials 14 and 15 to each of the first and second reactors 21 and 22, and heating the mixture to the temperature that is effective to reduce oxygen from the borate and the substantial simultaneous hydrogenation of the source of borate 11 to produce the borohydride. In the methodology, as seen most clearly by reference to FIG. 5, the method includes the steps of coupling the first reactor 21 in heat receiving relation relative to an electrical generation facility 40, and wherein the electrical generation facility 40, during operation, generates heat as a byproduct, and further generates a source of electricity 61; and coupling the source of electricity to the second reactor 22 to facilitate the formation of a high temperature plasma. Still further, the method may include a step of coupling the source of electricity 60 to the first reactor 21 to increase the temperature of the first reactor 21.

OPERATION

The operation of the described embodiment of the present invention is believed to be readily apparent and is briefly summarized at this point.

As described herein, a method of converting a first material into a second material includes the steps of providing a first reactor 21; providing a second reactor 22; coupling the first reactor 21 in heat receiving relation relative to an electrical generation facility 40, and wherein the electrical generation facility 40, during operation, produces a source of electricity 60, and heat as a byproduct, and wherein the first reactor 21 is heated to a first temperature. The method further includes steps of coupling the second reactor 22 with the source of electricity 60, and wherein the source of electricity 60 generates a thermal plasma within the second reactor 22; and supplying a source of a first material 11 to each of the first and second reactors 21 and 22, and wherein the first and second temperatures facilitate the chemical conversion of the first material 11 into the second material in the first and second reactors 21 and 22. As should be understood, the first material, as noted above, comprises borate and the second material comprises borohydride. Still further, in the methodology as described, the step of supplying a first material may comprise providing a source of borate 11; providing a source of hydrogen 12; and providing a source of a reactive metal and/or carbonaceous material 14-18, respectively, to form the first material mixture. Still further, in the methodology, as described, the first and second temperatures, as noted above, are effective to reduce the oxygen from the source of borate, and the substantially simultaneous hydrogenate the source of borate 11 to convert the source of borate into the second material, which comprises a borohydride. In the methodology as described, the reactive metals 16, 17 and/or 18 are selected from the group of metals that comprise aluminum, magnesium, titanium, chromium, silicon, tantalum, vanadium and zirconium. Additionally, the first temperature, as described above, is less than about 1000° C., and the second temperature is greater than about 1000° C. Additionally, the electrical generation facility 40 may be powered by fossil and/or nuclear fuels.

In the methodology for producing a borohydride as contemplated by the present invention, the method also includes the steps of, providing a source of a hydrated borate 11; providing a source of a reactive metal 16, 17 and/or 18; mixing the source of hydrated borate with the source of the reactive metal(s) to form a mixture; providing a first reactor 21, and supplying the mixture to the first reactor 21; sealing the first reactor 21 following the step of supplying the mixture to the first reactor 21; evacuating the first reactor 21 to create a negative pressure within the first reactor 21; and heating the mixture in the first reactor 21 to a temperature that facilitates the conversion of the hydrated borate to a borohydride and the production of hydrogen gas. Still further, the present methodology as contemplated above, includes the step of providing a source of a reactive metal 16, 17 and/or 18, which extracts the oxygen from the hydrated borate to form a stable oxide of the reactive metal. Still further, the methodology as contemplated above, includes the step of heating the mixture to a temperature of less than about 1000° C. Still further, in the practice of the method, noted above, it should be understood that the hydrogen produced by the chemical conversion of the hydrated borate 11 to the borohydride increases the gas pressure within the previously sealed first reactor 21.

In another aspect of the present methodology, the method for producing a borohydride further includes the steps of providing a source of anhydrous borate 11; providing a source of a reactive metal 16, 17 or 18; mixing the source of the anhydrous borate 11 with the source of the reactive metal 16, 17 or 18 to form a mixture; providing a first reactor 21; continuously supplying the mixture to the first reactor 21; supplying a source of hydrogen gas to the first reactor 21 while the mixture is received therein; and heating the mixture and the hydrogen gas that are in the chemical reactor to a temperature that facilitates the conversion of the anhydrous borate to a borohydride. In the methodology as described above, the step of heating the mixture occurs at a temperature of less than about 1000° C., and the reactive metals are selected from the group that comprises aluminum, magnesium, titanium, chromium, silicon, tantalum, vanadium, and zirconium. Still further, the anhydrous borate 11 as provided comprises sodium metaborate. In the methodology as described above, the first reactor may comprise, in the alternative, a continuous flow reactor and/or a chemical batch reactor.

Therefore it will be seen that the methodology of the present invention provides many advantages over the prior art practices, which have been confined largely to the use of complex solvent based chemical processing systems, and further, employs the heat and energy produced from a electrical generation facility in order to economically produce a borohydride compound that may be effectively utilized to store hydrogen that may be consumed by fuel cells, and for various overland vehicle applications.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method for producing a borohydride, comprising:
   heating a reaction mixture comprising a source of borate, at least one source of hydrogen and one or more of:
   a reactive metal selected from the group consisting of aluminum, titanium, chromium, silicon, tantalum, vanadium, and zirconium, and alloys thereof; and
   a carbonaceous material.

2. The method of claim 1, wherein heating a reaction mixture comprises heating the reaction mixture to a temperature that results in combustion of the one or more of the reactive metal and the carbonaceous material.

3. The method of claim 1, wherein heating a reaction mixture comprises heating the reaction mixture without substantially combusting the one or more of the reactive metal and the carbonaceous material.

4. The method of claim 1, wherein heating a reaction mixture comprising a source of borate, a source of hydrogen and one or more of: a reactive metal selected from the group consisting of aluminum, titanium, chromium, silicon, tantalum, vanadium, and zirconium, and alloys thereof; and a carbonaceous material comprises heating a reaction mixture comprising a source of borate, a source of hydrogen and a mixture of the one or more of the reactive metal and the carbonaceous material.

5. The method of claim 1, further comprising supplying at least a portion of the reaction mixture to each of a first reactor and a second reactor, wherein heating the at least a portion of the reaction mixture occurs in the first reactor and the second reactor.

6. The method of claim 5, further comprising:
   coupling the first reactor in heat receiving relation relative to an electrical generation facility, wherein the electrical generation facility, during operation, generates heat as a byproduct, and further generates a source of electricity; and
   coupling the source of electricity to the second reactor to facilitate the formation of a high temperature plasma.

7. The method of claim 6, further comprising coupling the source of electricity to the first reactor to increase a temperature of the second reactor.

8. The method of claim 6, wherein the first reactor is exposed to a temperature of less than about 1000° C., and the second reactor is exposed to a temperature of greater than about 1000° C.

* * * * *

UNITED STATES PATENT AND TRADEMARK OFFICE
CERTIFICATE OF CORRECTION

| | |
|---|---|
| PATENT NO. | : 7,741,428 B2 |
| APPLICATION NO. | : 12/196134 |
| DATED | : June 22, 2010 |
| INVENTOR(S) | : Peter C. Kong |

Page 1 of 2

It is certified that error appears in the above-identified patent and that said Letters Patent is hereby corrected as shown below:

In the drawings:
    In FIG. 1, in second reaction, on
        second line below title change "$2Al+CH_2+2H_2$" to --$2Al+CH_4+2H_2$--

Replace FIG. 1 with the following amended figure:

Signed and Sealed this
Third Day of July, 2012

David J. Kappos
*Director of the United States Patent and Trademark Office*

CERTIFICATE OF CORRECTION (continued)
U.S. Pat. No. 7,741,428 B2

In the specification:

| | | |
|---|---|---|
| COLUMN 2, | LINE 27, | change "(300 KJ)" to --(300 kJ)-- |
| COLUMN 3, | LINE 26, | change "Gibbs a Free" to --a Gibbs Free-- |
| COLUMN 4, | LINE 34, | change "$NaBH_4MgAl_2O_4$" to --$NaBH_4+MgAl_2O_4$-- |
| COLUMN 4, | LINE 43, | change "$NaBH_4Ta_2O_5+H_2$" to --$NaBH_4+Ta_2O_5+H_2$-- |
| COLUMN 4, | LINE 47, | change "$NaBH_4MgO+CO$" to --$NaBH_4+MgO+CO$-- |
| COLUMN 4, | LINE 49, | change "$NaBH_4Al_2O_3+CO+2H_2$" to --$NaBH_4+Al_2O_3+CO+2H_2$-- |
| COLUMN 4, | LINE 50, | change "$NaBH_4Al_2O_3+CO$" to --$NaBH_4+Al_2O_3+CO$-- |
| COLUMN 4, | LINE 52, | change "$NaBH_4Al_2O_3$" to --$NaBH_4+Al_2O_3$-- |
| COLUMN 5, | LINE 1, | change "$2NaBH_4MgAl_2O_4$" to --$2NaBH_4+MgAl_2O_4$-- |
| COLUMN 5, | LINE 3, | change "$NaBH_4TiO_2$" to --$NaBH_4+TiO_2$-- |
| COLUMN 5, | LINE 5, | change "$NaBH_4ZrO_2$" to --$NaBH_4+ZrO_2$-- |
| COLUMN 5, | LINE 12, | change "$NaBH_4SiO_2$" to --$NaBH_4+SiO_2$-- |
| COLUMN 5, | LINE 17, | change "hydrogen 14" to --hydrogen 12-- |
| COLUMN 5, | LINE 23, | change "$NaBH_4MgAl_2O_4$" to --$NaBH_4+MgAl_2O_4$-- |
| COLUMN 5, | LINE 25, | change "$2NaBH_4MgAl_2O_4$" to --$2NaBH_4+MgAl_2O_4$-- |
| COLUMN 5, | LINE 27, | change "$NaBH_4MgSiO_3$" to --$NaBH_4+MgSiO_3$-- |
| COLUMN 5, | LINE 31, | change "$NaBH_4MgTiO_3$" to --$NaBH_4+MgTiO_3$-- |
| COLUMN 5, | LINE 33, | change "$NaBH_4MgTi_2O_5+H_2$" to --$NaBH_4+MgTi_2O_5+H_2$-- |
| COLUMN 5, | LINE 37, | change "$NaBH_4MgTi_2O_5$" to --$NaBH_4+MgTi_2O_5$-- |
| COLUMN 5, | LINE 52, | change "information show" to --information shown-- |
| COLUMN 6, | LINE 3, | change "provided, and which" to --provided, which-- |
| COLUMN 7, | LINE 65, | change "less then about" to --less than about-- |
| COLUMN 11, | LINE 10, | change "and the substantially" to --and substantially-- |